United States Patent [19]

Barger

[11] Patent Number: 4,662,750
[45] Date of Patent: May 5, 1987

[54] ANGLE SENSITIVE INTERFEROMETER AND CONTROL METHOD AND APPARATUS

[76] Inventor: Richard L. Barger, P.O. Box 223, Rollinsville, Colo. 80474

[21] Appl. No.: 589,499

[22] Filed: Mar. 14, 1984

[51] Int. Cl.[4] ............................................. G01B 9/02
[52] U.S. Cl. .................... 356/345; 356/353; 356/363
[58] Field of Search ...................... 356/345, 363, 353

[56] References Cited

U.S. PATENT DOCUMENTS 4,330,211  5/1982  Peterson et al. ............... 356/363 X
4,504,147  3/1985  Huang ............................... 356/363

FOREIGN PATENT DOCUMENTS 4619271  9/1971  Japan ................................. 356/363

OTHER PUBLICATIONS

R. S. Longhurst, Geometrical and Physics Optics, 2d Ed., pp. 144–158, (1967).
R. L. Barger, "Influence of Second-Order Dopler Effect on Ramsey Fringe Profiles," 6 Optics Letters, at 145–147, (Mar. 1981).
V. Daneu, et al, "Accurate Laser Wavelength Measurements in the Infrared and Far Infrared . . . ", 29A Physics Letters, (Jun. 2, 1969).

Primary Examiner—Vincent P. McGraw
Assistant Examiner—S. A. Turner
Attorney, Agent, or Firm—James R. Young

[57] ABSTRACT

An angle-sensitive interferometer includes a first beam splitter for splitting a beam of coherent radiation into two portions and a second beam splitter for recombining the two beam portions to produce an interference pattern. It also includes reflecting mirrors and lenses for recombining the two beam segments in such a manner that an angle of deviation in the incident beam results in the recombined beams diverging from the interferometer axis to create a wedge angle. A corner cube reflector, cat's eye reflector, or a telescope with either convex lenses or concave mirrors are used for this purpose. The invention also includes a mirror in one of the beam portion paths to reflect it out of alignment with that beam portion path emerging from the first beam splitter so that the second beam splitter where the beam portions are recombined does not produce feed back into the radiation source. A quadrant diode is used to detect asymmetrical changes of intensity in the fringe pattern indicative of angle change of the incident beam. Apparatus for detecting, measuring, and controlling beam angles are also included.

40 Claims, 13 Drawing Figures

ANGLE SENSITIVE INTERFEROMETER AND CONTROL METHOD AND APPARATUS

BACKGROUND OF THE INVENTION

This invention is related to methods and apparatus for measuring and controlling angles between objects and, more specifically, to a method and apparatus, including angle sensitive interferometer apparatus, for detecting and controlling angle changes in an incident beam of coherent radiation such as lasers, and utilizing same for measuring and controlling angles between objects and devices.

There are many circumstances or situations in which it is desireable to measure very accurately and even control very precisely the angles or relative positions and orientations between two or more objects or points. Laser beams, which are very intense, coherent beams of monochromatic light, have been used quite successfully for accurate angle detection and alignment application such as surveying devices and guidance systems. However, even these highly accurate laser instruments which are based on the nature of a laser beam to not spread out widely in space, are limited. There is a need for even more accurate angle measuring and control capability to detect and control more minute angle changes than possible with present laser and other devices for many applications, including command guidance systems for space vehicles, materials testing devices and the like. This invention utilizes radiation interference phenomenon to achieve such desired extremely accurage angle measuring and controlling results.

When two or more trains or beams of coherent electromagnetic radiation, such as laser light, microwaves, radio frequency waves, and the like, cross each other or are superimposed on each other, the resultant wave displacement at any point and at any instant is the sum of the instantaneous displacement that would be produced at the point by the individual wave trains if each was present alone. Where the respective waves are in phase with each other, their displacements would add resulting in increased intensity. However, where the respective waves are out of phase with each other, they cancel resulting in decreased intensity. Such increasing or decreasing of intensity by crossing or superimposing trains or beams of electromagnetic radiation on each other is referred to as interference. Where the waves are in phase and add respective displacements to increase intensity, the interference is constructive. where the waves are out of phase and their respective displacements cancel to decrease intensity, the interference is destructive.

It is known that when a beam of laser light or other coherent electromagnetic radiation is split into two parts to produce two beams and each of the two parts is made to travel a different path and then joined together again, they will produce a fringe pattern of intense, bright bands separated by less intense, dark bands. Such fringe patterns can be observed, and the distances between the bands in the fringe pattern are related to the wave lengths of the radiation. Thus, it has long been recognized that the wave lengths of light can be measured by producing an interference fringe pattern, measuring the separation of the bands in the fringe pattern, and, through mathematical equations, calculating the wave length of the light.

The essential feature of the formation of fringes is the division of a beam of light by partial reflection at a surface, and the subsequent recombination of the two disturbances or separated parts of the beam. Apparatus for producing interference fringes in this manner are referred to as interferometers.

There are a number of two-beam interferometers that have been developed and used for measuring the wavelength or frequency of radiation. For example, in the Michelson interferometer, which is well known to persons skilled in this art, the beam is divided into two beams of approximately equal intensity by a beam splitter. The beams are reflected at respective front silvered mirrors and recombined at the beam splitter. Other standard interferometer apparatus known to persons skilled in this art include the Twyman and Green interferometer, the Jamin interferometer, and the Mach-Zehnder interferometer. These standard known interferometers can be designed to have very high sensitivity for wavelength or frequency measurements. Other interferometer apparatus, such as the Köster's interferometer and Dowell's interferometer have been designed for such purposes as measuring slip gauges and distances very accurately. However, all of these prior art interferometer apparatus suffer from feedback and are severely limited in their angle sensitivity and effectiveness in angle measuring and controlling applications.

Feedback in prior art interferometers results from a portion of the radiation emitted from a radiation source, such as a laser, being reflected from the interferometer directly back into the laser source. Such beam or radiation feedback into the laser or radiation source produces interaction between the reflected light and the laser medium resulting in undesireable changes in frequency, intensity, and even the angle of the laser beam. Other detrimental effects in prior art devices can result from wavefront distortion due to physical limitations of size and structure of reflecting devices that limit the useable portion of beam diameter.

Another characteristic in the prior art interferometers, such as Michelson, Mach-Zehnder, and the like, is that the superimposed output beams are parallel even when the angle of the incoming incident beam is varied. Therefore, the intensity distribution in the fringe pattern of a normal Michelson interferometer or the like is described by the equation:

$$p\lambda = 2t \cos \theta, \qquad (1)$$

where p is the order number of the interference fringe, $\lambda$ is the wavelength of the radiation (related to the radiation frequency $\gamma$ by the definition $\lambda = C/\gamma$, where C is the speed of light), t is the difference in the optical path length for the two separated beams within the interferometer, and $\theta$ is the angle of incidence of the light beam on the interferometer. The change of intensity for a small angle $\theta$ is proportional to $\theta^2$. Such a relationship does not provide a particularly angle-sensitive interferometer.

SUMMARY OF THE INVENTION

Accordingly, it is a general object of the present invention to provide a novel, highly sensitive and accurate method and apparatus for measuring and controlling angles between two or more objects or points.

It is also a general object of the present invention to provide a method and apparatus for detecting minute angle changes in a beam of radiation.

A more specific object of the present invention is to provide a very angle-sensitive interferometer for angle changes in an incoming or incident beam of radiation in any plane or direction with respect to the interferometer axis.

Still another specific object of the present invention is to provide an interferometer that has no reflected beam feedback into the incoming radiation beam or source even when the incoming radiation beam fills the interferometer aperture.

A further object of the present invention is to provide an angle-sensitive interferometer that minimizes wavefront distortion to maximize the useable diameter of the laser or other radiation beam.

A still further object of the present invention is to provide a method and apparatus for accurately transducing minute angle changes in an incoming beam of radiation in any direction with respect to the axis of an interferometer into electrical signals that can be processed and utilized to measure or control such angle changes.

Another object of the present invention is to provide a method and apparatus for maintaining a laser beam directed at a precise angle or orientation.

Yet another object of the present invention is to provide a method and apparatus for maintaining an accurate angular alignment or orientation in any direction between two objects or points.

Still another object of the present invention is to provide an accurate method and apparatus for inducing and controlling a deflection or scanning laser beam through a precisely controlled angle or sector.

A still further object of the present invention is to provide a method and apparatus in which the orientation between two or more objects or the direction of a laser beam can be controlled by varying any one or more of the three parameters of angle of incidence of the laser beam on the angle-sensitive interferometer, the wavelength of the laser beam, or the interferometer path difference between the two portions of the split beam.

The apparatus of the present invention includes an interferometer for producing an interference fringe pattern that varies greatly in intensity and intensity symmetry with a change in angle of the beam of radiation incident on the interferometer. This angle sensitivity is accomplished by splitting a coherent incoming beam into two portions of approximately equal intensity, reversing the direction of the first beam portion in a parallel, offset path with a corner cube retroreflector or a cat's eye lens and mirror retroreflector, specularly reflecting and diverting the second beam portion out of its path of alignment with the first beam splitter to a point of intersection with the reversed first beam portion, and recombining the first and second beam portions at the point of intersection with another beam splitter in such a manner that approximately equal parts of the first and second beam portions are superimposed on each other in a fashion that will create a good interference fringe pattern without feedback of any part of the beam portions through the interferometer aperture or into the incoming beam.

An alternate embodiment of the invention obtains the same results by passing the first beam portion through an angle reversing optical beam transmitter before superimposing parts of the first and second beam portions together to create the interference fringe pattern. One such angle reversing transmitter is comprised of two convex lenses axially separated by a distance equal to the sum of their respective focal lengths. Another embodiment of a suitable angle reversing transmitter is a pair of concave mirrors separated by a distance equal to their respective focal lengths.

The invention also includes the use of a quadrant diode detector comprised of four separate radiation sensitive diodes in combination with the angle-sensitive interferometer for detecting asymmetrical variations in fringe pattern intensity indicative of an angle change of the incident radiation beam. This apparatus is used in several different embodiments for measuring incident beam angle variations, stabilizing radiation beams on a target, maintaining precise angular alignment of a laser or radiation beam or orientation between two bodies, and remote or master controls for a servo-radiation beam deflector to sweep or scan the beam over precise sectors or areas.

BRIEF DESCRIPTION OF THE DRAWINGS

These and other objects and advantages of the present invention will become more apparent as the description proceeds, taken in conjunction with the following drawings, in which.

DETAILED DESCRIPTION OF THE PREFERRED EMBODIMENT

Figure 1:
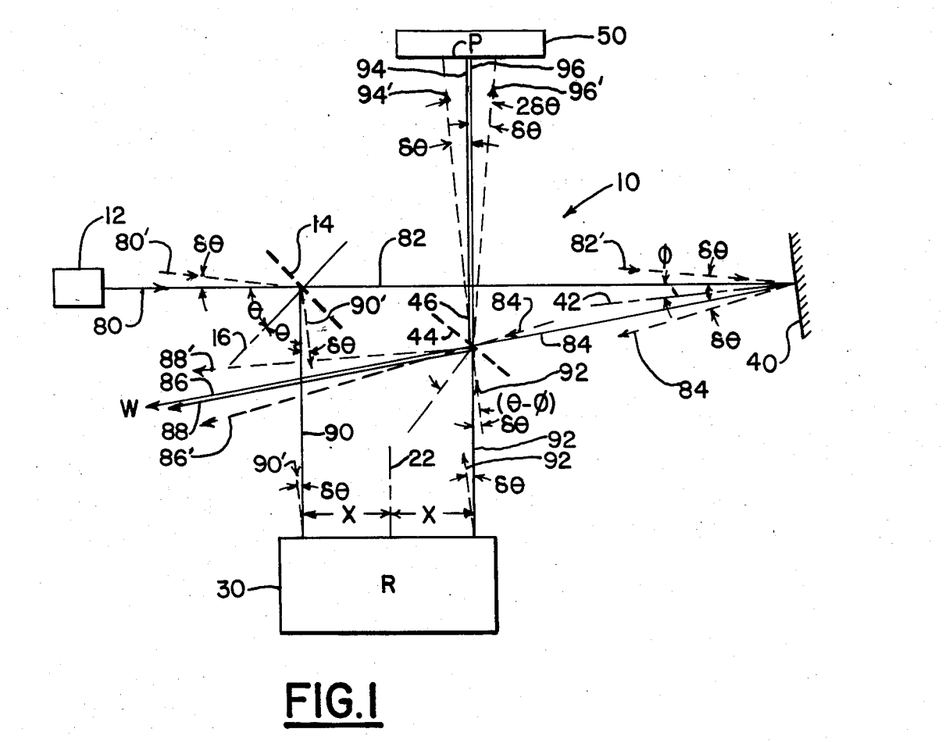
FIG. 1 is a diagramatic view of the angle-sensitive interferometer apparatus of the present invention.

The angle-sensitive interferometer 10, which is the essential component of the method and apparatus of this invention is shown in FIG. 1. It utilizes a source of coherent plane wave electromagnetic radiation source, such as a laser 12, although it can also use a microwave or radio frequency transmitting antenna as well. For convenience, this description will refer to a laser radiation source, since it is preferred and is very practical and accurate in most applications.

The laser 12 projects an incoming beam 80 to the interferometer 10. The incoming beam 80 strikes a beam splitter 14, such as a half-silvered mirror, which divides the incoming beam 80 into two beams 82, 90. The incoming beam 80 strikes the beam splitter mirror 14 at an incident angle $\theta$ to an axis 16 normal to the mirror 14 so that the reflected beam 90 leaves the mirror 14 at an angle $\theta$ from the normal axis 16.

The reflected beam 90 then strikes a retroreflector apparatus R which reflects a beam back in the opposite direction parallel to the reflected beam 90 a spaced distance laterally from beam 90. For example, if there is a distance X between beam 90 and a line of symmetry 22 of the retroreflector device R, the emerging beam 92 is a distance X on the opposite side of the line of symmetry 22 and directed in the opposite direction. Regardless of what angle the beam 90 strikes the retroreflector R, the emerging beam 92 will be parallel to beam 90, and the two beams 90, 92 will be equal distances X on opposite sides of the line of symmetry 22.

The non-reflected portion 82 of beam 80 emerging from the beam splitter 14 continues in a straight line beyond the line of beam 92 to a mirror 40. This mirror 40 is tilted so that its normal axis 42 is at an angle $\phi$ with beam 82. Consequently, beam 82 is reflected in a beam 84 at an angle $2\phi$ from beam 82.

A second beam splitter 44 is positioned at the intersection of beam 84 with beam 92 at an angle such that its normal axis 46 is at an angle $\theta - \phi$ from beam 92. This beam splitter 44 splits beam 92 into two parts, and it splits beam 84 into two parts. The transmitted part of beam 92 is beam 94, and the reflected part of beam 92 is beam 88. The transmitted part of beam 84 is beam 86, and the reflected part of beam 84 is beam 96. As can be seen in FIG. 1, the beams 94, 96 are recombined at beam splitter 44. Consequently, these recombined beams 94, 96 interfere with each other and create an interference fringe pattern on plane P. The retroreflector R can be made adjustable in a direction parallel to beams 90, 92 so that the path distance of beams 90, 92 can be adjusted in order to adjust the path differences of beams 94, 96 to produce the desired optimum intensity fringe pattern at plane P.

It is significant to note that beams 86, 88, which are also recombined to form a beam W, continue from beam splitter 44 at the angle $2\phi$ from beams 80, 82. Therefore, they miss and do not feed back into beam 80 or laser 12. Consequently, the inaccuracies produced from feedback in prior art interferometers are avoided in this interferometer according to this invention.

It is also significant that this interferometer 10 of the present invention produces a wedge angle between the output beams 94, 96 when there is a change in the incident angle of input beam 80. Such an angle change $\delta\theta$ is illustrated in FIG. 1 with the beams at the new angle shown in broken lines with corresponding beam designation numerals in prime for clarity. These beams are illustrated in what appears to be relatively large angles, also for clarity, but it should be understood that these actual angle changes are so small in use, and this interferometer is so angle-sensitive, that the actual beam offset is negligible compared to the actual diameters of the light beams.

As illustrated in FIG. 1, when there is an angle change $\delta\theta$ of the input beam 80' from the original input beam 80, this same angle change $\delta\theta$ occurs in the beams 90', 92', 82', 84', 86', 88', 94', and 96'. However, it is significant to note that the beams 94', 96' diverge in opposite directions from the original beam paths 94, 96. Consequently, there is a wedge angle of $2\delta\theta$ produced between the output beams 94', 96', when the input beam 80' varies an angle of $\delta\theta$ from the original input beam 80. This wedge angle $2\delta\theta$ produces the high angle sensitivity of this interferometer.

As illustrated in FIG. 1, in order to obtain this wedge angle $2\delta\theta$ between the wave fronts of the two recombined beam portions 94', 96' according to this invention, the two split portions 82', 90' of the incoming beam 80' have to be recombined after one split portion 90' undergoes an angle $\delta\theta$ reversal with respect to the other split portion 82'. In the preferred embodiment of FIG. 1, the split beam portion 90' is put through such an angle $\delta\theta$ reversal with respect to the split beam portion 82' by the retroreflector 30. The resulting angle reversed beam portions 92' is produced. However, as also shown in FIG. 1, the split beam portion 82' is not retroreflected, thus it does not undergo an angle reversal. On the contrary, split beam portion 82' is specularly reflected by plane mirror 40 to produce beam portion 84' which has no angle $\delta\theta$ reversal. Therefore, when non-angle reversed beam portion 84' is recombined with angle reversed beam portion 92' at the second beam splitter 44, the resulting wedge angle osf $2\delta\theta$ is produced between the wave fronts of recombined beam portions 94' and 96'.

The two output beams 94', 96' superimposed at the detector plane P produce wedge type interference fringes. The intensity distribution I of the fringes for a small angle change $\delta\theta$ in the incoming beam 80' is described in the ratio:

$$\frac{I}{I_{max}} = \frac{1}{2}\left\{ 1 + \cos\left[ \frac{2\pi}{\lambda}(2t + 2Z\delta\theta) \right] \right\}, \quad (2)$$

where t is the difference in optical path length of the two beams within the interferometer, $\lambda$ is the wavelength of the radiation, and Z is the distance from the center of the fringe pattern measured in the direction of the angle change $\delta\theta$.

Figure 4:
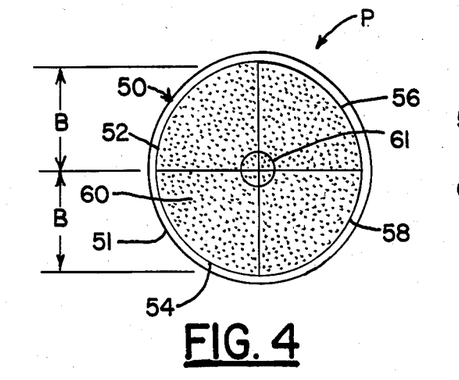
FIG. 4 is a front elevation view of the quadrant diode utilized with the angle-sensitive interferometer of the present invention with an interference fringe pattern thereon produced by an incident beam normal to the interferometer.

When the angle of the input beam 80 into the interferometer is zero, the intensity distribution of the fringe pattern is symmetric around the center of the laser beam. This symmetric distribution of the fringe pattern on plane P is illustrated in FIG. 4. The plane P for the purposes of angle detection, measurement, and control can be comprised of a quadrant diode 50. The quadrant diode 50 is comprised of four separate light sensitive diode detectors 52, 54, 56, and 58 shaped and set together as the quadrants of a circle in a frame 51. These diodes produce an electrical current which is proportional to the intensity of light impinging on their surfaces. The type of electronic measuring and control circuits required would, of course, depend on the kind of light detectors used. However, specific light detectors and electronic circuits, which can be obtained or made as necessary by persons skilled in that art, are not considered to be part of this invention.

The interference fringe pattern 60 around the center laser beam 61 on the quadrant diode 50, as shown in FIG. 4, is symmetric as would be produced by an input beam 80 incident at a zero angle on the interferometer. The electrical output of each diode 52, 54, 56, and 58 is approximately equal.

Figure 5:
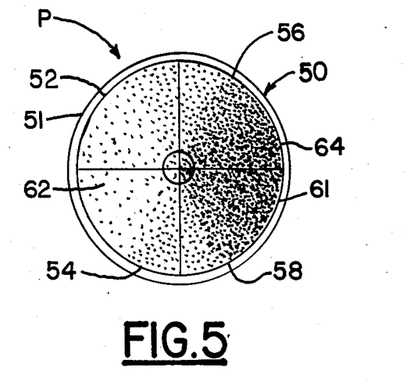
FIG. 5 is a front elevation view of the quadrant diode with an interference fringe pattern thereon produced by an incident beam at an angle to normal coming into the interferometer.

When the angle of the input beam 80' is varied by $\delta\theta$, the intensity I of the fringe pattern becomes asymmetrical, as illustrated in FIG. 5. The asymmetry produced by this angle change $\delta\theta$ is in intensity distribution of the fringe pattern rather than its shape. Therefore, as shown in FIG. 5, an input beam 80' angle change of $\delta\theta$ could produce a more intense fringe pattern 64 on diodes 56, 58, with a less intense fringe pattern 62 on diodes 52, 54. Thus, the electrical outputs or signals from diodes 52, 54, 56, 58 would vary in proportion to the fringe intensity on each diode. Of course, a change of angle of the input beam in a different direction would result in a different asymmetry and different asymmetrical diode output signals corresponding to the asymmetry of the fringe pattern intensity. The difference between integrals over the two halves of the quadrant diode 50 having a height 2B gives the detected signal S as a ratio to the maximum 100% signal S max, as follows:

$$\frac{S}{S_{max}} \approx \pi \left[ \sin\left(2\pi \frac{2t}{\lambda}\right) \right] \left[ \frac{1 - \cos\left(2\pi \frac{B\delta\theta}{\lambda}\right)}{2\pi \frac{B\delta\theta}{\lambda}} \right], \quad (3)$$

$$\therefore \frac{S}{S_{max}} \approx 2\pi^2 \left[ \sin\left(2\pi \frac{2t}{\lambda}\right) \right] \left[ \frac{B\delta\theta}{\lambda} \right], \quad (4)$$

for small $\delta\theta$.

As discussed above, the conditions for a normal Michelson interferometer to go from zero to maximum intensity as $\delta\theta$ is increased from zero are given by:

$$t\delta\theta^2 = \lambda, \quad (5)$$

as can be seen from equation (1).

Such conditions for the angle-sensitive interferometer according to this invention are given by:

$$B\delta\theta = \lambda/2, \quad (6)$$

as can be seen from equation (3).

Therefore, it can be appreciated that the dependence on $\delta\theta^2$ for the Michelson interferometer and $\delta\theta$ for the interferometer of this invention demonstrates the extremely superior angle sensitivity of the interferometer of this invention. For comparison of angle sensitivities, note that for the normal Michelson interferometer, $\delta\theta$ for maximum signal depends on the path difference t of the two arms or beams, and the wavelength $\lambda$. However, for the angle-sensitive interferometer of this invention, $\delta\theta$ for maximum signal is dependent only on the detector dimension B, or the laser beam diameter, whichever is smaller, and wavelength $\lambda$. For example, for a quadrant diode detector 50 having a dimension B = 1 cm and for red laser radiation, 100 percent signal intensity is obtained for $\delta\theta \approx 3 \times 10^{-5}$ radians. However, in order to obtain a 100 percent signal intensity for such a $\delta\theta$ angle change of $3 \times 10^{-5}$ radians with a normal Michelson interferometer, the Michelson interferometer would have to have a path difference t nearly a kilometer long.

Again, as discussed above, such theoretical angle sensitivity is virtually useless for most significant applications if it is destroyed by feedback into the incoming or incident laser beam 80 or 80'. If any portion of the split beam was reflected or directed back into the source beam 80 or 80', interaction would occur between the reflected beam and the laser medium. Such interaction would cause detrimental changes in frequency, intensity, and even in the angle of the laser beam, thus destroying the accuracy and angle sensitivity of this interferometer. It is essential to accomplish the desired benefits of this invention that such feedback be avoided. Such feedback cannot be prevented by merely having a beam splitter, such as the beam splitter 14, in the path of the reflected beam portion of the beam incident thereon.

As shown in FIG. 1, and as discussed briefly above, feedback is avoided in this invention by orienting the specular mirror 40 at an angle $\phi$ greater than zero to the incident beam portion 82, thereby reflecting beam portion 84, 84' out of the path of the incident beam portion 82, 82'. In this manner, there cannot be any feedback into the source beam 80, 80'. On the contrary, as shown in FIG. 1, the wavefront W of the reflected beams 86, 86', 88, 88' is directed in a different direction to completely avoid the source laser beam 80, 80'.

In order to produce a fringe pattern, however, the retroreflected beam portion 92, 92' and the specularly reflected beam portion 84, 84' must be recombined in parallel. Such parallel recombination according to the preferred embodiment illustrated in FIG. 1 is accomplished with the second beam splitter 44 oriented with its normal axis at an angle $\theta - \phi$ from the retroreflected beam portion 92 as described above.

Figure 2:
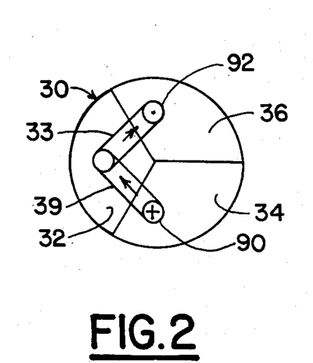
FIG. 2 is a front elevation view of a corner cube retroreflector device utilized in the angle-sensitive interferometer of the present invention.
Figure 3:
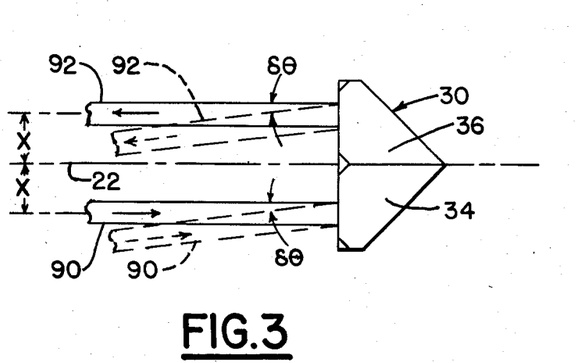
FIG. 3 is a side elevation view of a corner cube retroreflector device utilized in the angle-sensitive interferometer of the present invention.

The retroreflector R of the angle-sensitive interferometer shown in FIG. 1 can be a corner cube 30, such as the one shown in FIGS. 2 and 3. The corner cube 30 is comprised of three mirror surfaces 32, 34, 36, each of which is mutually perpendicular to the other two mirror surfaces. An incoming beam 90 that strikes one mirror surface, such as 34, as illustrated in FIG. 2, will be reflected first to an adjacent mirror surface 32, as shown at 39, and then to the third mirror surface 36, as shown at 38. The third mirror surface then reflects the beam back out at 92 parallel to the incoming beam 90 an equal distance X on the opposite side of the line of symmetry 22. As shown in FIG. 3, the corner cube 30 will always even reflect a beam 90' deviated an angle $\delta\theta$ from original beam 90 back outwardly at 92' parallel to incoming beam 90' and at the same angle deviation $\delta\theta$ from original reflected beam 92.

The use of a corner cube 30 for the retroreflector R makes the interferometer of the present invention achromatic, i.e., it is useable for any wave length without adjustment. It also gives no distortion of the light beam when it is positioned so that the beam does not intersect the joints between the mirror surfaces.

Figure 6:
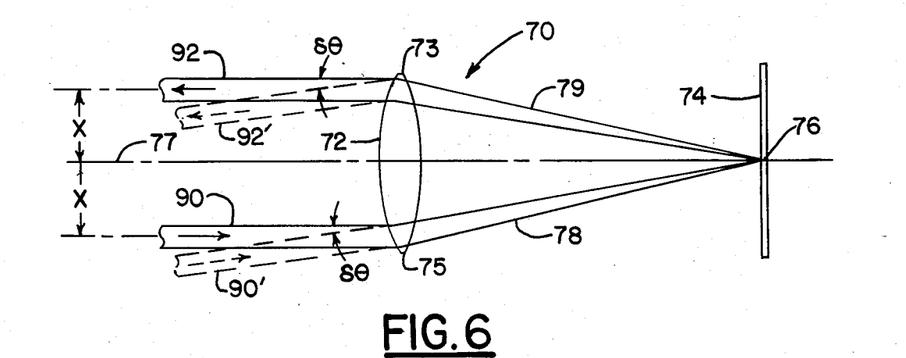
FIG. 6 is a side elevation view of the alternate cat's eye retroreflector utilized in the angle-sensitive interferometer of the present invention.

An alternate retroreflector R embodiment 70 having certain advantages is shown in FIG. 6. This embodiment 70, a cat's eye, is comprised of a small convex lens 72 with a small, light-weight mirror 74 positioned at the focal point 76 of the lens 72 and normal to the line of symmetry 77 of the lens 72. An incoming beam 90 is incident on one side 75 of the lens 72 where it is focused at 78 to the focal point 76 on the mirror 74. The reflected beam 79 is then directed to the opposite side 73 of lens 72, where it is projected outwardly at 92 parallel to incoming beam 90. As with the corner cube 30 described above, this cat's eye retroreflector embodiment 70 also reflects an incoming beam 90' at an angle $\delta\theta$ to original beam 90 back outwardly at 92', parallel to incoming beam 90'.

This cat's eye retroreflector 70 makes it possible to quickly change the beam path difference in the interferometer by translating the mirror 74 along the axis 77 of the cat's eye lens 72. It should be noted that the beam path difference can also be varied easily and quickly by using an electro-optical crystal (not shown) in one of the beam paths.

From the discussion above of the characteristics of the corner cube and cat's eye retroreflectors illustrated in FIGS. 2, 3, and 6, and as shown in FIG. 1, the use of a retroreflector 30 for angle $\delta\theta$ reversal in combination with a specularly reflecting mirror 40 and a properly oriented second beam splitter 44, parallel beam portion recombination with a wave front wedge angle $2\delta\theta$ always occurs regardless of the plane or direction of the angular deviation $\delta\theta$ of the incident source beam 80' with respect to the axis of the interferometer 10. Further, such orthogonal angle sensitivity is accomplished without feedback into the laser source beam, so the results are extremely accurate and effective to detect incident or incoming beam angle changes $\delta\theta$ in any direction.

Figure 7:
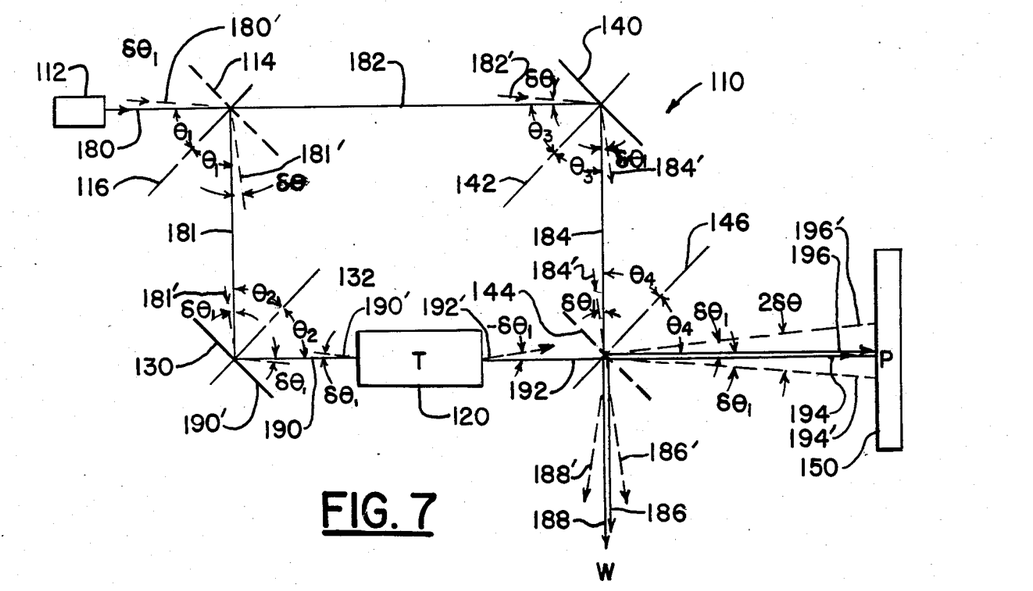
FIG. 7 is a diagramatic view of an alternate embodiment of the angle-sensitive interferometer of the present invention utilizing optical transmission angle reverser apparatus rather than a retroreflector.

An alternate embodiment 110 interferometer according to this invention is shown in FIG. 7. This alternate embodiment 110, as the preferred embodiment 10 described above, is highly sensitive to angle changes orthogonally in the incoming beam. Further, as in the preferred embodiment 10, this alternate embodiment 110 accomplishes such orthogonal angle sensitivity by splitting an incoming beam of coherent radiation, reversing the angle of deviation in one of the split beam portions with respect to the other, and recombining them congruent with each other without feedback into the source beam. However, rather than utilizing a retroreflector R for reversing the angle $\delta\theta$ in one of the split beam portions with respect to the other, as in the embodiment 10 shown in FIG. 1, this embodiment 110 utilizes a transmission device T that reverses a change $\delta\theta$ in the input angle in one split beam portion.

Figure 8:
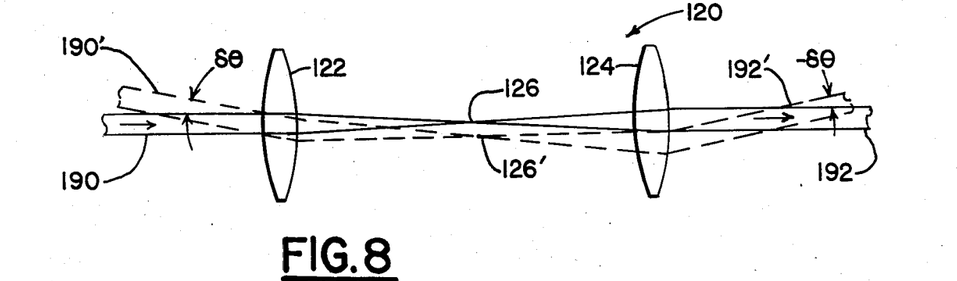
FIG. 8 is a side elevation view of one embodiment of the optical transmission angle reverser apparatus utilized in the alternate embodiment of the angle-sensitive interferometer shown in FIG. 7.

An example of such a transmission device T is shown in FIG. 8 as a telescope 120 having two convex lenses 122, 124 separated axially by a distance equal to the sum of their focal lengths. An incoming beam 190 passes through the first lens 122 where it is focused to converge on the focal point 126. From the focal point 126, the beam diverges and passes through the second lens 124 where it continues as beam 192. A deviated incoming beam 190' at an angle $\delta\theta$ to the original beam 190 will pass through a displaced focal point 126' between the two lenses 122, 124 and emerge as beam 192' at a reverse angle $-\delta\theta$ with respect to the original beam 192.

Referring again to FIG. 7 for a detailed description of the alternate embodiment 110 of this invention, an incoming beam 180 from a laser 112 or other electromagnetic radiation source is incident on a beam splitter 114 having a normal axis 116 at an angle $\theta_1$ to the beam 180. The beam splitter 114 divides the beam 180 into two parts 181, 182. The beam portion 181 is reflected downwardly to a specularly reflecting mirror 130. The mirror 130 specularly reflects the beam 190 at an angle $\theta_2$ to the mirror's normal axis 132 to the angle reversing transmission device T 120. The transmission device T 120 reverses the incident angle of beam 190 and directs it as beam 192 to a second beam splitter 144.

The beam portion 182 that passes through beam splitter 114 is specularly reflected by a specularly reflecting mirror 140 at an angle $\theta_3$ to the mirror's normal axis 142 to the second beam splitter 144. The two beams 184, 192 are rejoined and superimposed on each other at the second beam splitter 144. The resulting superimposed or recombined beams 194, 196 are directed at an angle $\theta_4$ to the normal axis 146 of beam splitter 144 to a plane P comprised of a quadrant diode 150. As in the preferred embodiment 10, the recombined beams 194, 196 of this alternate embodiment 110 produce an interference fringe pattern on the quadrant diode 150. When the incoming laser beam 180 impinges on the interferometer at an angle producing a uniform intensity fringe pattern, the electrical output signals from the quadrant diode are balanced or equal. The arrangement of the mirrors 130, 140 produces the two recombined beams 194, 196 in the direction of the quadrant diode 150 at equal angle outputs when $\theta_2-\theta_1=\theta_4-\theta_3$.

An angle change or deviation of $\delta\theta$ in the input beam 180' from original beam 180 results in equal, but opposite, angle changes of $\delta\theta$ and $-\delta\theta$ respecctively, in the two output beams 194', 196'. The effect is the same as described for the embodiment shown in FIG. 1 in that a wedge angle of $2\delta\theta$ is produced between the diverging beams 194', 196'. Therefore, this embodiment 110 also has extremely good angle sensitivity. Also, as in the preferred embodiment 10 of FIG. 1 described above, there is no feed back or light reflected back to the laser 112. The extra beams 186, 186', 188, 188' are directed by the second beam splitter 144 downwardly in the direction W away from all other components of the interferometer 110.

Another embodiment 170 of an angle reversing transmission device T for use in the alternate embodiment interferometer 110 described above is shown in FIG. 9. This embodiment 170 is in the nature of a telescope comprised of two concave mirrors 172, 174 separated by a distance equal to the sum of their focal lengths. Each mirror is laterally offset from the other a sufficient distance to allow the beams to bypass them in the respective incoming and outgoing beam paths to the opposite mirror. The incoming beam 190 bypasses the second mirror 174 to strike the curved surface of the first mirror 172. The reflected beam 175 from the first mirror 172 converges through a focal point 173 midway between the two mirrors 172, 174 and diverges again to the curved reflector surface of the second mirror 174. The beam 175 is reflected from the second mirror as outgoing beam 192, which bypasses the first mirror 172.

Figure 9:
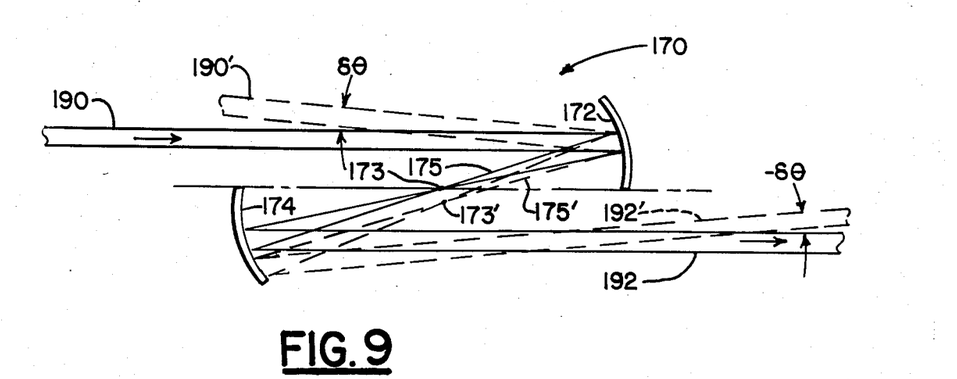
FIG. 9 is a side elevation view of a second embodiment of the optical transmission angle reverser apparatus utilized in the alternate embodiment angle-sensitive interferometer shown in FIG. 7.

If the incoming beam 190' is varied at an angle $\delta\theta$ from the original incoming beam 190, the reflected beam 175' will converge through an offset focal point 173' from the first mirror 172 to the second mirror 174.

Then the outgoing beam 192′ emerges at a reverse angle $-\delta\theta$ from the original outgoing beam 192.

The intensity and symmetry of the fringe pattern on the quadrant diode 50 in both interferometer embodiments 10, 110 described above can be varied by changing any one or more of the following parameters: (1) the incident angle $\theta$ of the incoming beam; (2) the wave length $\lambda$ of the radiation, or (3) the beam path difference t. Therefore, in applications where this angle-sensitive interferometer is to be used as a control device, it can be activated by varying any one or more of these three parameters.

Figure 10:
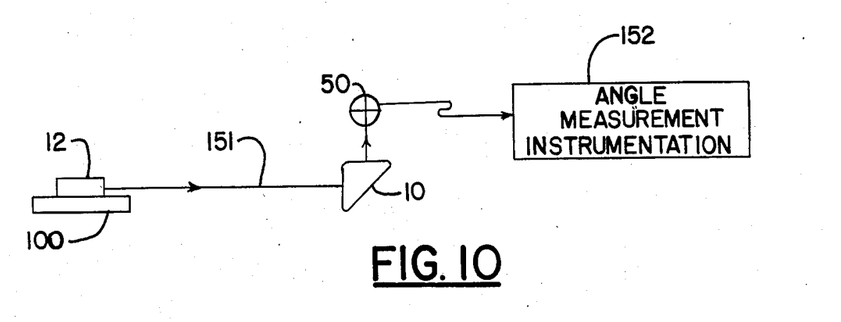
FIG. 10 is a schematic diagram of an accurate angle measuring method and apparatus according to the present invention.

Several applications of the angle-sensitive interferometers 10 or 110 are illustrated in FIGS. 10 through 13. In FIG. 10, a laser 12 is mounted on an object 100. It directs a beam to the inerferometer 10, which produces an inerference fringe pattern on the quadrant diode 50. The angle measurement instrumentation 152 is designed to monitor the outputs or signals from the four quadrant diodes and to convert those signals to units of angular measurement indicative of the angle at which the laser beam is incident on the interferometer.

Figure 11:
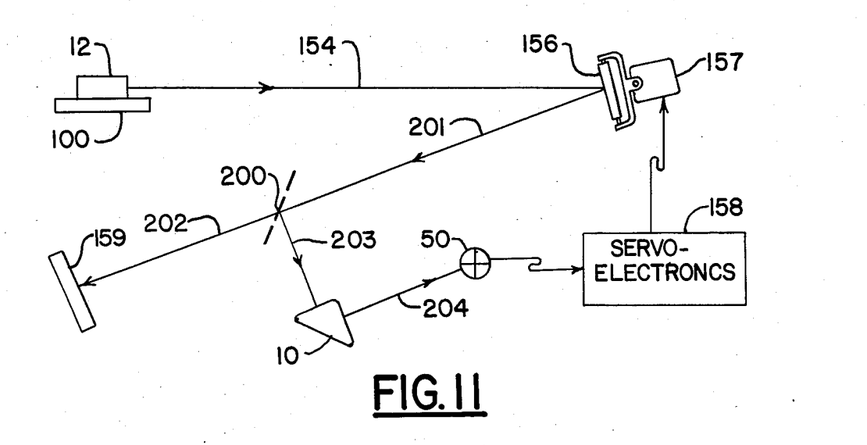
FIG. 11 is a schematic diagram of an accurate servo control method and apparatus for maintaining a precise orientation of a laser beam according to the present invention.

The device in FIG. 11 is useful for accurately directing and maintaining the angle of a laser beam with respect to the interferometer axis. The laser 12 mounted on object 100 transmits a laser beam 154 to a servo-adjustable mirror 156. The beam 154 is then reflected as beam 201 from mirror 156 to beam splitter 200. The beam splitter 200 splits the beam 201 into two components 202, 203, and beam 203 is directed to the inteferometer 10. The interferometer produces a recombined beam 204 with a fringe pattern on quadrant diode 50. If there is a change in the laser beam 154, the resulting angle change will be detected by the quadrant diode 50. The servo-electronics 158 then processes the change in electrical signals from the quadrant diode 50 and outputs signals to the servo-motor apparatus 157 to readjust the mirror about two orthogonal axes as necessary to keep the angle of beam 202 constant.

Figure 12:
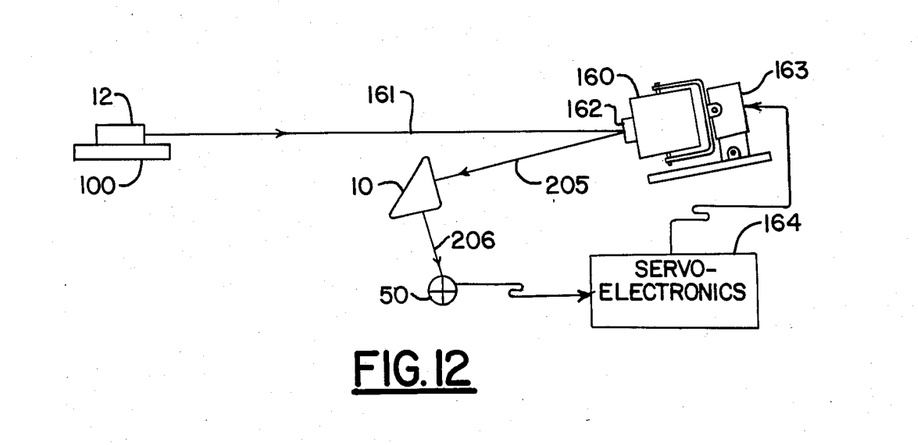
FIG. 12 is a schematic diagram of an accurate method and apparatus for precision control of the angular orientation of two objects in relation to each other.

The apparatus shown in FIG. 12 is arranged to maintain an object 160 in precise alignment and orientation with respect to the interferometer axis. A laser 12 mounted on object 100 directs a beam 161 to a mirror 162 mounted in an orthogonal axes adjustable mechanism 163. The mirror 162 reflects the beam at 205 to the interferometer 10, which produces a recombined beam 206 with an interference fringe pattern on the quadrant diode 50. If the object 160 moves out of alignment, the resulting beam angle change will cause a change of intensity symmetry in the fringe pattern. The resulting signal changes from the diode 50 are monitored and processed by the servo-electronics 164, which outputs appropriate signals to the servo-motor 163 to move object 160 back into alignment.

Figure 13:
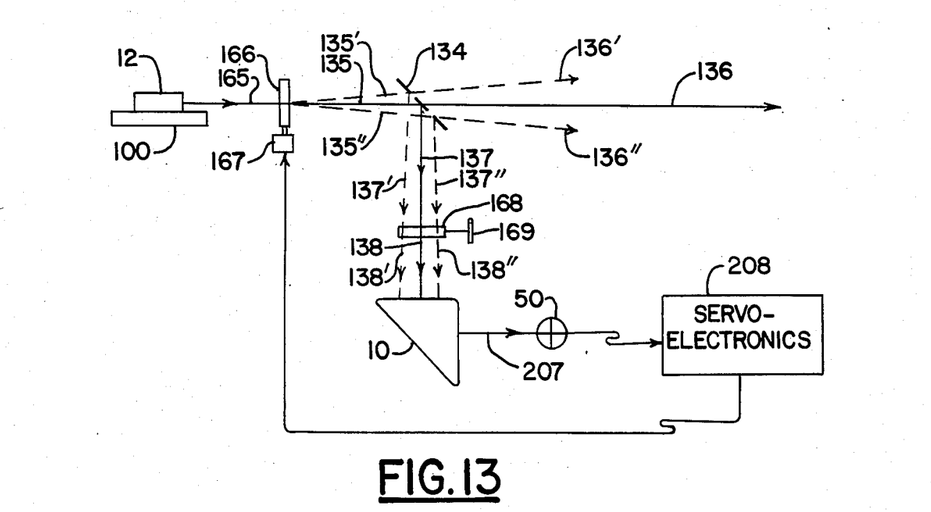
FIG. 13 is a schematic diagram of an accurate method and apparatus for controlling a scanning laser beam through a precise sector.

The apparatus shown in FIG. 13 is for remotely and accurately controlling a beam deflector 166 to deflect beam 136 through a precise scanning sector between beams 136′, 136″. The laser 12 is mounted on an object 100. The beam deflector 166 is intended to deflect beam 165 through a scanning sector. The beam 135 emerging from the deflector 166 strikes a beam splitter 134. A part of the beam 136 continues beyond the splitter 134 to scan the desired sector, and the other part of the beam 137 is reflected by the beam splitter 134 to the interferometer 10. A control deflector 168 is interposed in beam 137 between splitter 134 and interferometer 10 to change the angle of beam 138. This angle change induced by deflector 168 through operator or computer input control 169 will cause a change in the fringe in beam 207 that will be detected by quadrant diode 50. The servo-electronics 208 monitoring the diode 50 will process the changed electrical signals from diode 50 and output signals to servo-motor 167 to move deflector 166 until this angle change exactly cancels the angle change introduced by deflector 168. In this manner, the master deflector 168 can be used to precisely control the servo-deflector 166 to scan the laser beam 136 through the desired sector. This arrangement allows the interferometer of this invention to be utilized to control scanning through large angles between beams 136′ and 136″ without extending the interferometer outside its very small, precise angle measuring capabilities. It has this capability because it always maintains beam 138 at virtually zero angle with respect to the interferometer axis regardless of how large the scan angle is between beams 136′ and 136″.

Accordingly, the present invention has been described with some degree of particularity directed to the preferred embodiments of the present invention. It should be appreciated, though, that the present invention is defined by the following claims construed in light of the prior art so that modifications or changes may be made to the preferred embodiment of the present invention without departing from the inventive concepts contained herein.

I claim:

1. Angle-sensitive interferometer apparatus for creating an interference fringe pattern in relation to the angle of incidence of a beam of radiation on said interferometer, comprising:

a first beam splitter which reflects a first portion of the beam and passes therethrough a second portion of the beam, said first beam splitter having a normal axis oriented at an angle $\theta$ from the incident beam thereon;

a retroreflector capable of reflecting the outgoing part of a beam parallel to and offset from the incoming part of a beam positioned in the path of said first beam portion;

a specularly reflecting mirror positioned in the path of said second beam portion and having a normal axis oriented at an angle $\phi$ greater than zero degrees from the incident second beam portion sufficient to prevent feedback and oriented to reflect said second beam portion to intersect said first beam portion outgoing from said retroreflector; and a second beam splitter positioned at the intersection of said first and second beam portions and having a normal axis oriented at an angle $\theta-\phi$ from said first beam portion that is incident thereon.

2. The angle-sensitive interferometer of claim 1, wherein said retroreflector is comprised of a corner cube having three mirror surfaces all oriented mutually perpendicular to each of the others.

3. The angle-sensitive interferometer of claim 1, wherein said retroreflector is comprised of a convex cat's eye lens with a flat mirror positioned on its focal point and normal to the axis of said lens.

4. Angle-sensitive interferometer apparatus for creating an interference fringe pattern in relation to the angle of incidence of a beam of radiation in said interferometer, comprising:

a first beam splitter which reflects a first portion of the beam and passes therethrough a second portion of the beam, said first beam splitter having a normal axis oriented at an angle $\theta_1$ from the incident beam;

a second beam splitter positioned a spaced-apart distance from said first beam splitter and not in the path of either beam portion split out by said first beam splitter;

a first mirror in the path of said first beam portion for reflecting said first beam portion toward said second beam splitter, said first mirror having a normal axis oriented at an angle $\theta_2$ from said first beam portion;

a second mirror in the path of said second beam portion for reflecting said second beam portion toward said second beam splitter, said second mirror having a normal axis oriented at an angle $\theta_3$ from said second beam portion, the second beam splitter having a normal axis oriented at an angle $\theta_4$ from said second beam portion in such a manner that $\theta_2 - \theta_1 = \theta_4 - \theta_3$; and an angle reversing beam transmission device positioned in the path of said first beam portion between said first mirror and said second beam splitter.

5. The angle-sensitive interferometer of claim 4, wherein said angle reversing transmission device includes two convex lenses separated axially a distance equal to the sum of their respective focal lengths.

6. The angle-sensitive interferometer of claim 4, wherein said angle reversing transmission device includes two concave mirrors separated by a distance equal to the sum of their respective focal lengths and positioned with their respective axes offset from each other.

7. Apparatus for detecting changes of incident angle of a primary beam of coherent radiation, comprising:
    interferometer means for splitting said primary beam into two secondary beam portions, reversing the incident angle change of one beam portion with respect to the other, and then recombining said secondary beam portions to produce a fringe pattern in such a manner that no part of the secondary coherent beam portions is directed back parallel to said primary beam, and
    radiation sensitive detector means positioned in the path of said recombined beam for detecting asymmetric changes in intensity in the fringe pattern.

8. The apparatus of claim 7, wherein said radiation sensitive detector means includes a plurality of individual radiation sensitive diodes positioned adjacent each other in the path of said recombined secondary beam portions.

9. The apparatus of claim 7, wherein said interferometer means includes means for creating a wedge angle interference fringe pattern upon deviation of said primary beam from the axis of said interferometer.

10. The apparatus of claim 9, wherein said interferometer means includes a first beam splitter in the path of said primary beam of coherent radiation for splitting said primary beam into first and second secondary beam portions, retroreflector means in the path of said first secondary portion of said beam for reversing the direction of said first secondary portion in an offset parallel relation to itself, specularly reflecting mirror means in the path of said second secondary portion of said beam for reflecting said second secondary portion in a direction away from the incident second secondary beam portion to a point of intersection with said retroreflected first secondary portion at a point removed from said first beam splitter, and a second beam splitter positioned at said point of intersection.

11. The apparatus of claim 10, wherein said retroreflector means includes a corner cube reflector having three planar mirror surfaces oriented mutually perpendicular from each other.

12. The apparatus of claim 10, wherein said retroreflector means includes a convex lens positioned in the path of said first secondary portion with this first secondary portion offset from the lens axis a distance greater than the width of the beam and a mirror positioned at the focal point of the lens to reflect the first beam portion back to the lens.

13. The apparatus of claim 7, wherein said interferometer means includes a first beam splitter in the path of said primary beam of coherent radiation, a first mirror positioned in said first secondary portion of the beam to reflect this first secondary portion out of its initial path and away from said first beam splitter, a second mirror in the path of the second secondary portion of the beam to reflect this second secondary portion to a point of intersection with the reflected first secondary portion of the beam, and angle reversing optical transmitter means positioned in one of said secondary portions for reversing any angle of deviation of a said primary beam of coherent radiation from the interferometer axis.

14. The apparatus of claim 13, wherein said reversing optical transmitter means is comprised of a telescope having two convex lenses separated axially from each other a distance equal to the sum of their respective focal lengths.

15. The apparatus of claim 13, wherein said reversing optical transmitter means is comprised of a telescope having two concave mirrors facing each other in offset relation to each other in their respective axes and separated a distance equal to the sum of their respective focal lengths.

16. Angle measuring and control apparatus, comprising:
    electromagnetic radiation producing means for producing a coherent beam of radiation;
    first beam splitter means for splitting said beam into first and second beam portions;
    reversing means for reversing the incident angle change of the first beam portion with respect to the incident angle change of the second beam portion;
    specular reflector means positioned for directing the second beam portion incident thereon to a point of intersection with said angle-reversed first beam portion in a direction away from the incident beam portion to prevent feedback and at a position removed from said first beam splitter; and
    second beam splitter means positioned at said point of intersection of said reflected first and second beam portions for recombining at least parts of said first and second beam portions.

17. The angle measuring and control apparatus of claim 16, wherein said second beam splitter means and said specular reflector means are oriented in such a manner that an incident angle change $\delta\theta$ in said beam results in a wedge angle of $2\delta\theta$ between said recombined parts of said first and second beam portions.

18. The angle measuring and control apparatus of claim 17, wherein said reversing means is an optical retroreflector.

19. The angle measuring and control apparatus of claim 18, wherein said optical retroreflector is a corner cube having three planar mirror surfaces, each of which is oriented mutually perpendicular to the other two mirror surfaces.

20. The angle measuring and control apparatus of claim 18, wherein said optical retroreflector is a cat's eye, a lens with a mirror positioned at its focal point.

21. The angle measuring and control apparatus of claim 18, including detector means in the path of said recombined parts of said first beam and second beam portions for detecting asymmetry in the intensity of the interference fringe pattern and outputting signal data corresponding to the magnitude of such asymmetry.

22. The angle measuring and control apparatus of claim 18, wherein said first beam splitter means is comprised of a partially reflective mirror having a normal axis at an angle $\theta$ from the beam, said first reflector means is for retroreflecting said first beam portion in an outgoing manner away therefrom in parallel relation to said incoming first beam portion and in spaced apart relation thereto, said second reflector means is a specularly reflecting mirror in the path of said second beam portion oriented with its normal axis at an angle $\phi$ not equal to zero from said second beam portion, and said second beam splitter means is a second partially reflective mirror positioned in the paths of both said reflected first beam portion and said reflected second beam portion, with the normal axis of said second mirror at an angle of $\theta - \phi$ from said reflected first beam portion incident thereon.

23. The angle measuring and control apparatus of claim 22, including detector means positioned in the path of said recombined beam parts, said detector means being comprised of four radiation sensitive diodes positioned adjacent each other in the form of quadrants of a circle.

24. The angle measuring and control apparatus of claim 23, including angle measurement instrumentation means connected to said diodes for converting output signals from said diodes to units of angle measurement.

25. The angle measuring and control apparatus of claim 23, including servo-mirror means positioned between said radiation producing means and said first beam splitter for reflecting and directing the beam produced by said radiation producing means, third beam splitting means positioned between said servo-mirror means and said first beam splitter means for splitting said beam; and servo-electronic means connected to said diodes and to said servo-mirror means for activating said servo-mirror means to rotate in response to an asymmetric fringe pattern intensity change on said diodes.

26. The angle measuring and control apparatus of claim 23, including servo-mirror means positioned between said radiation producing means and said first beam splitter for reflecting and directing the beam produced by said radiation producing means toward said first beam splitter, and servo-electronics means connected to said diodes and to said servo-mirror for activating said servo-mirror to rotate in response to an asymmetric fringe pattern intensity change on said diodes.

27. The angle measuring and control apparatus of claim 23, including servo-beam deflector means positioned between said radiation producing means and said first beam splitter for deflecting the beam produced by said radiation producing means, third beam splitter means positioned between said servo-beam deflector means and said first beam splitter means for splitting said beam, master beam deflector means positioned in the beam path between said first and third beam splitter means for deflecting the portion of said beam between the first and third beam splitter means, and servo-electronic means connected to said diodes and to said servo-deflector means for activating said servo-deflector means in reponse to an asymmetric fringe pattern intensity change on said diodes.

28. The angle measuring and control apparatus of claim 17, wherein said specular reflector means is a first mirror, and said reversing means includes a second mirror for reflecting said first beam portion toward said second beam splitter and angle reversing transmission means for outputting a beam that enters therein at an angle variation $\delta\theta$ from a normal incoming beam in a reverse angle $-\delta\theta$ from a normal outgoing beam.

29. The angle measuring and control apparatus of claim 28, wherein said angle reversing transmission means includes two convex lenses separated axially by a distance equal to the sum of their respective focal lengths.

30. The angle measuring and control apparatus of claim 28, wherein said angle reversing transmission means includes two concave mirrors facing each other with their axes offset from each other and separated by a distance equal to the sum of their respective focal lengths.

31. The method of producing angle-sensitive interference fringe patterns from a coherent beam of radiation, comprising the steps of:
dividing said beam into a first beam portion and a second beam portion of equal intensity;
reversing the direction of the first beam portion in parallel, offset relation to itself;
specularly reflecting said second beam portion to a point of intersection with the reversed first beam portion in such a manner that said reflected second beam portion is not parallel with said incident second beam portion so there is no feedback of radiation into the coherent beam; and
recombining a part of said first beam portion with a part of said second beam portion at said point of intersection in such a manner that an interference fringe pattern is produced around said recombined beam parts and in such a manner that there is no feedback of any of the beam parts into said coherent beam.

32. The method of claim 31, including the steps of reversing the direction of said first beam portion by positioning a corner cube having three mirror surfaces oriented in separate planes mutually perpendicular to each other in the path of said first beam portion in such a manner that said first beam portion initially strikes only one of said mirror surfaces from where it is reflected to the other mirror surfaces and ultimately reversed in direction.

33. The method of claim 31, including the steps of reversing the direction of said first beam portion by positioning a cat's eye lens in the path of said first beam portion with a mirror positioned axially behind the lens at its focal point and normal to the axis of the lens, said lens being positioned in the path of said first beam portion with the beam offset from said lens axis a distance greater than one-half the width of the beam.

34. The method of producing angle-sensitive interference fringe patterns from a coherent beam of radiation, comprising the steps of:
dividing said beam into a first beam portion and a second beam portion;

reflecting both said first and second beam portions to a point of intersection a spaced distance from the point of dividing the beam and not in alignment with either of the initially divided portions;

positioning an angle reversing beam transmitter in the path of said first beam portion in front of the point of intersection with said second beam portion; and recombining parts of both said first and second beam portions with each other at the point of intersection.

35. The method of claim 34, including the step of reversing the angle of the first beam portion by passing it through two convex lenses separated axially by a distance equal to the sum of their respective focal lengths.

36. The method of claim 34, including the step of reversing the angle of the first beam portion by reflecting it between two concave mirrors facing eachother in axially offset relation and separated by a distance equal to the sum of their respective focal lengths.

37. The method of detecting an angle change in a coherent beam of radiation, comprising the steps of:

passing the beam through the full aperture of an interferometer capable of separating and recombining the beam in a manner that produces an asymmetric fringe pattern intensity change in response to an angle change in the beam with no part of the beam being reflected back parallel to the incoming beam so that there is no feedback into the coherent beam of radiation anywhere in the full aperture of the interferometer;

positioning a plurality of individual radiation sensitive diodes adjacent each other in the recombined beam path for detecting asymmetric changes in the interference fringe pattern.

38. The method of claim 37, including the steps of splitting the beam in the interferometer and reflecting the split beam portions in such a manner as to recombine them with the angle of change in the original incident beam diverging apart in the recombined parts of the beam to produce a wedge interference fringe pattern.

39. The method of claim 38, including the step of reversing the angle of deviation in one split beam portion by passing it through a retroreflector which reverses direction of the beam portion in parallel, offset relation to its unreflected path.

40. The method of claim 38, including the step of reversing the angle of deviation in one split beam portion by passing it through an angle reversing telescope optical transmitter.

* * * * *

UNITED STATES PATENT AND TRADEMARK OFFICE
CERTIFICATE OF CORRECTION

PATENT NO. : 4,662,750

DATED : May 5, 1987

INVENTOR(S) : Richard L. Barger

It is certified that error appears in the above-identified patent and that said Letters Patent is hereby corrected as shown below:

In column 1, line 32, change "accurage" to --accurate--.

In column 1, line 49, change "where" to --Where--.

In column 6, line 41, change "osf" to --of--.

In column 10, line 36, change "respecctively" to --respectively--.

In column 11, line 37, change "read-just" to --re-adjust--.

Signed and Sealed this

Twenty-second Day of September, 1987

Attest:

DONALD J. QUIGG

Attesting Officer     Commissioner of Patents and Trademarks